United States Patent [19]

Moser

[11] Patent Number: 4,800,018

[45] Date of Patent: Jan. 24, 1989

[54] PORTABLE WATER PURIFICATION SYSTEM

[76] Inventor: Ronald T. Moser, c/o Northwestern Resources, Inc., P.O. Box 898, Anderson, Calif. 96007

[21] Appl. No.: 31,857

[22] Filed: Mar. 30, 1987

[51] Int. Cl.$^4$ ............................................. B01D 27/02
[52] U.S. Cl. .................................. 210/266; 210/282; 210/470; 210/472; 210/484
[58] Field of Search ............... 210/266, 282, 472, 484, 210/470, 238

[56] References Cited

U.S. PATENT DOCUMENTS

| | | | |
|---|---|---|---|
| 2,633,990 | 4/1953 | Simpson et al. | 210/282 |
| 3,327,859 | 6/1967 | Pall | 210/282 |
| 3,392,837 | 7/1968 | Sanzenbacher | 210/282 |
| 3,799,352 | 3/1974 | McClive | 210/282 |

FOREIGN PATENT DOCUMENTS 338021 11/1930 United Kingdom .

Primary Examiner—Ivars Cintins

[57] ABSTRACT

A simplified portable water purification system provides an unfiltered water receiving compartment, a disposable filter cartridge, and a filtered water reservoir all in a single container. The container has a removable lid and is a vertically positioned, wide-mouth, tubular structure. The disposable filter cartridge is horizontally positioned centrally and divides the container into the two compartments. Contaminated and unfiltered water poured into the top receiving compartment of the container gravitates through filtering materials in the disposable filter cartridge. Filtering materials comprising a top macro fabric filter, a core of silver impregnated granular activated carbon, and a bottom micro fabric filter remove contaminants and sediments from the water percolated through the disposable filter cartridge. The taste of the water is improved and possible odors are removed. A spigot is provided low on the container into the filtered water recovery and reservoir compartment for drawing filtered water to use.

5 Claims, 2 Drawing Sheets

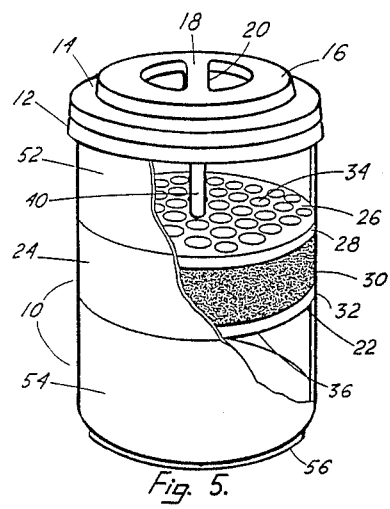
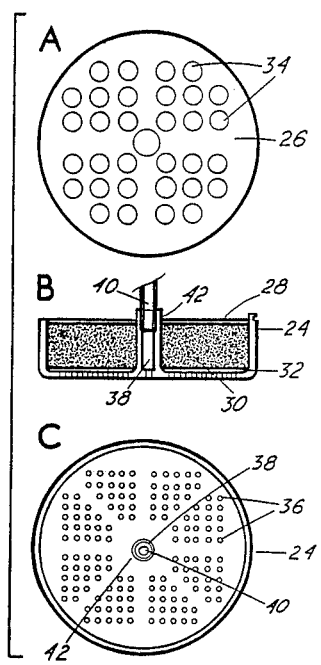
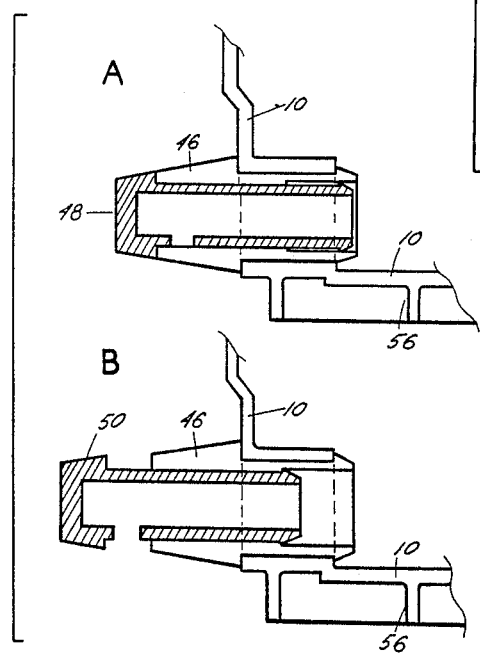
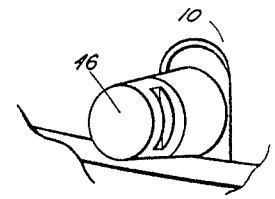
Fig. 5.
Fig. 6.
Fig. 7.
Fig. 8.

PORTABLE WATER PURIFICATION SYSTEM

BACKGROUND OF THE INVENTION

1. Field of the Invention

This invention relates to systems and equipment for water purification. The present invention is particularly directed towards a simplified portable water purification system. The simplification is accomplished in the present invention by providing an unfiltered water receiving compartment, a disposable filter cartridge, and a filtered water reservoir all in a single container.

2. Description of the Prior Art

The use of sand and of charcoal as filtering agents for water purification is seen in many issued patents. How filtering devices are structured and the mechanics applied to treated carbon filteration is the improvement factor set forth in the present invention.

Developing state-of-art patents would include M. W. Warne, U.S. Pat. No. 30,366, dated Oct. 9, 1860, and the Davis & Wright patent dated Jul. 30, 1895, U.S. Pat. No. 543,677, as early examples. In later examples, we see the Water-Conditioning Unit of Sanzenbacher, dated Jul. 16, 1968, U.S. Pat. No. 3,392,837; the 1978 patent of Behrman for a Water Purification Means and Method, U.S. Pat. No. 4,094,779; the Water Treatment Apparatus of Moore, issued Jun. 2,1981, U.S. Pat. No. 4,271,015; and the Portable Sink Top Water Conditioner of Stanley, dated Sept. 1, 1981, U.S. Pat. No. 4,287,057. In portable equipment, the Bennethum Survival and Water Purification System, a portable bag-like device, issued Apr. 17, 1984, U.S. Pat. No. 4,443,336; and the Filter For Water Jugs described by Jaye in U.S. Pat. No. 4,491,520, dated Jan. 1, 1985, seem dominate.

The foregoing list of patented devices and systems seemed most pertinent to the system of the present invention. An examination of the prior art patents indicates the present invention to be a considerable improvement in the field of portable water purification systems.

SUMMARY OF THE INVENTION

To overcome deficiencies seen in the past art, the present invention provides a simple and effective water filtering system confined to a single container. The container is a vertically positioned tubular structure having the downwardly end sealed to a base as a part thereof and the upwardly end wide-mouthed with a removable handled lid as a sealer therefor, the structure useful for the containment of water. The container is divided into upper and lower compartments by a centrally placed, horizontally positioned disposable filter cartridge. The upper compartment of the container is the unfiltered water receiving compartment. The lower compartment is thick-walled to form a support edge for the disposable filter cartridge and is the water recovery and reservoir compartment. An edging member useful as a carrying handle and designated as a rib handle, rims the opened end lip of the container and accepts the removable handled lid which seals down on the edge of the rib handle frame. Air vent apertures in the lid handle align with an internally installed air venting straw. The removable lid allows access to the upper compartment of the container used as the receiving chamber for unfiltered water. The centrally fitted disposable filter cartridge houses filtering materials which are retained in the disposable filter cartridge structure by a flow-regulating apertured cover. The flow-regulating apertured cover allows the unfiltered water to gravitate into and through the filtering material encased in the disposable filter cartridge.

The filtering materials encased in the disposable filter cartridge include a top positioned macro fabric filter and a bottom positioned micro fabric filter between which is sandwiched a filtering medium. The filtering medium material used may vary. The present invention incorporates use of silver empregnated granular activated carbon as a filtering medium which is described as a part of this invention hereinafter. The bottom surface of the disposable filter cartridge is holed with flow-regulating apertures which direct the passage of filtered water into the lower filtered water compartment and reservoir of the container. A venting straw and a straw-holder tube passed centrally through the disposable filter cartridge allows air displacement to accur in the filtered water compartment and reservoir through the apertures in the container lid handle structure. The lower compartment receives the filtered water passed from the upper compartment through the disposable filter cartridge and is a reservoir for the filtered water. A manual spigot in the lower wall of the filtered water compartment allows releasing the purified water for use.

Therefore, it is a primary object of this invention to overcome limitations in the design of past-art devices by incorporating an unfiltered water receiving compartment, a disposable filter cartridge, and a filtered water recovery and reservoir compartment all in a single portable container.

Another object of the invention is to provide a complete water filtering system in a single, wide-mouth container in which the unfiltered water receiving compartment can be filled from a water tap, by scooping water up from a lake or stream, or by filling from another utensil.

A further object of the invention is to provide a complete practical water filtration system in single containers of different sizes useful for a variety of applications.

A still further object of the present invention is to provide a water purification system in a container structured with an efficient and easily replaced disposable filter cartridge.

Other objects and the many advantages of the present invention will become better understood from reading the following specification and comparing the numbered parts described with like numbered parts illustrated in the drawings.

BRIEF DESCRIPTION OF THE DRAWINGS

In the drawings

FIG. 5 is a perspective view of the container illustrated in FIG. 1 with the walls sectioned to show the disposable filter cartridge position and the air venting straw.

FIG. 6 at A, B, and C illustrates the disposable filter cartridge. The larger apertured sealer cover is shown in a top plan view at A. The disposable cartridge structure with filtering materials encased is shown at B in a vertical sectional view. The smaller apertured bottom of the disposable filter cartridge is shown in an inverse plan view at C.

FIG. 7 is a sectional view of the spigot used in this filtering system with the spigot in closed position at A and in opened position at B.

FIG. 8 is a perspective drawing of the spigot used in this system.

Figure 1:
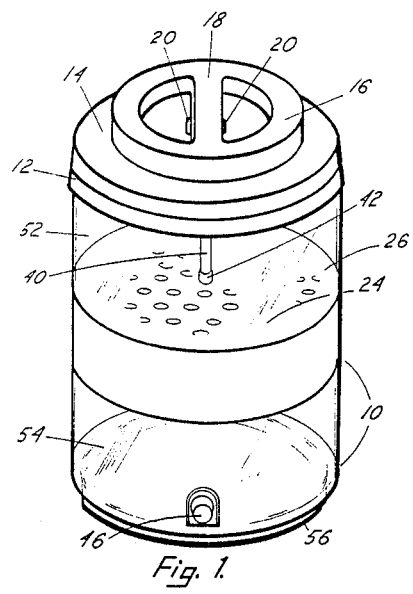
FIG. 1 illustrates an embodiment of the invention sized for commercial and family-type use.

DRAWING REFERENCE NUMERALS 10 container
12 rib handle
14 handled lid
16 circular lid handle frame
18 lid handle grip
20 lid handle air vent apertures
22 container support ledge for disposable filter cartridge
24 disposable filter cartridge
26 disposable filter cartridge cover
28 macro fabric filter
30 silver empregnated granular activated carbon
32 micro fabric filter
34 upper flow-regulating apertures
36 lower flow-regulating apertures
38 tapered venting straw chamber
40 venting straw
42 venting straw boss grip
46 spigot
48 spigot closed
50 spigot opened
52 unfiltered water receiving compartment
54 filtered water recovery compartment and resevoir
56 base support platform

DESCRIPTION OF PREFERRED EMBODIMENTS

Figure 2:
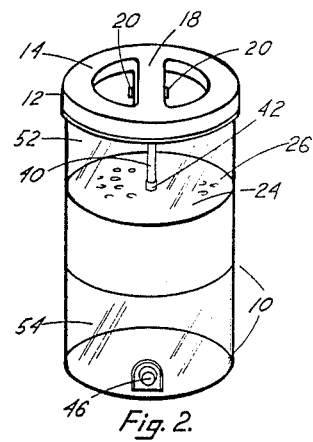
FIG. 2 shows a smaller highly portable embodiment of the invention.

Referring now to the drawings at FIG. 1 and FIG. 2 where two embodiments of the present invention are illustrated. The larger container 10 shown in FIG. 1, has rib handle 12 affixed to and encircling the wide container fill mouth with lid 14 seated against the upper lip of rib handle 12. A raised circular section of lid 14 is formed into a circular handle frame 16. A crosswise lid handle grip 18 diameters circular handle frame 16 with circular handle frame 16 acting as an abuttment to crosswise lid handle grip 18. Lid handle air vent apertures 20 are formed substantially centrally in the lower side walls of lid handle grip 18. The material of container 10 can be transparent, translucent, or opaque and is illustrated herein as structured of tansparent plastic. Container 10 is divided into two compartments, the divider being a centrally positioned disposable filter cartridge 24. Disposable filter cartridge 24 is removable, fitting snuggly the inside walls of the upper container structure which is the unfiltered water receiving compartment 52. The bottom of disposable filter cartridge 24 rests on container disposable filter cartridge ledge 22 which is an upper lip of the widened walls of the lower container filtered water recovery compartment and reservoir 54. The entire container 10 and assemblage is supported by a raised support platform 56 affixed to the base of container 10. Filtered water for use can be obtained through manually operated spigot 46 in the lower side wall of filtered water recovery compartment and reservoir 54.

Figure 3:
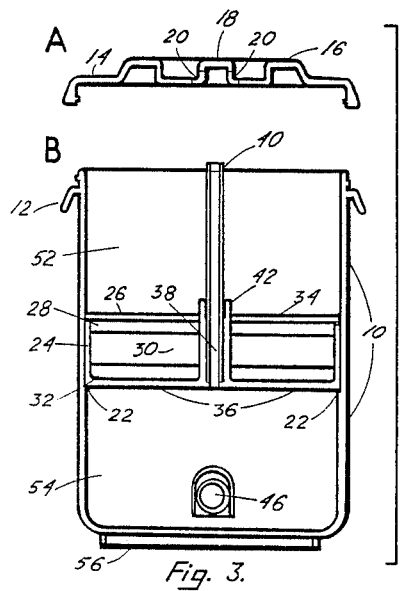
FIG. 3 is a sectional drawing of the FIG. 1 embodiment showing the opened lid at A and the internal assemblage at B.
Figure 4:
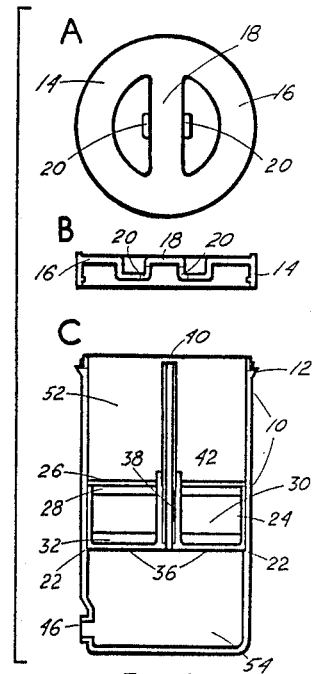
FIG. 4 is a sectional drawing of the FIG. 2 embodiment and illustrates the container lid in a top plan view at A, a sectional side view of the container lid at B, and a sectional side view of the container and internal structure at C.

The unique structure and positioning of disposable filter cartridge 24 is illustrated in FIG. 3, FIG. 4, FIG. 5, and FIG. 6. The disposable filter cartridge of the larger container 10, shown in FIG. 3, is similarly structured and similarly positioned in all embodiments of this invention.

Referring to FIG. 6 at A. A disposable filter cartridge cover 26 is holed with large upper flow-regulating apertures 34 sufficiently sized for easy passage of useable contanimated or unfiltered water into disposable filter cartridge 24. After charging the containment area of disposable filter cartridge 24 with filtering materials, disposable cartridge filter cover 26 is affixed permanently to the top of disposable filter cartridge 24 encaasing the filtering materials. The filtering materials so encased include macro fabric filter 28 as the top layer, a wider section filled with a filtering medium, the filtering medium used in the present invention being silver empregnated granular carbon 30, and there being a base layer composed of micro fiber filter 32. The floor of disposable filter cartridge 24 is holed with small flow-regulating apertures 36 sized to allow filtered water to gravitate into filtered water recovery compartment and reservoir 54. The center of the floor in disposable filter cartridge 24 is tubed upwardly into a slanted air vent opening and a venting straw chamber 38 with the upper section sized and shaped as a boss grip 42 in which a venting straw 40 is retained. Venting straw chamber 38 is opened through disposable filter cartridge 24 into filtered water recovery compartment and reservoir 54. This allows compensating air passage for water input into filtered water recovery compartment and reservoir 54 when a spigot 46 is closed (48, FIG. 7-A). When siigot 46 is opened (50, FIG. 7-B) for drawing filtered water from filtered water recovery compartment and reservoir 54, venting straw 40 through lid handle apertures 20 activates air displacement and allows the filtered water to free-flow through spigot 46. For drawing filtered water, spigot 46 is fitted through the container 10 wall in the lower part of filtered water recovery compartment and reservoir 54. Spigot 46 is a pull type device shown in FIG. 7 at A in closed position 48 and at B in opened position 50. The appearance of spigot 46 in the wall at the base of container 10 is illustrated by FIG. 8.

In operation, the various embodiments of this invention function similarly. Lid 14 is removed from the wide mouth upper end of container 10 and unfiltered tap water can be passed therethrough into unfiltered water receiving compartment 52. As the units are portable, unfiltered water may also be obtained by scooping or by dipping container 10 into a stream or lake or by poured water into container 10 from another utensil. Contaminated or unfiltered water deposited into the unfiltered water receiving compartment 52 is processed automatically by gravitation. The uncleaned water moves downward through apertures 34 in cover 26 into disposable filter cartridge 24. The water is then purified by percolating through the elements of disposable filter cartridge 24. A macro fabric filter 28, the top element, removes larger particles and sediments. Silver empregnated granular activated carbon 30, a most effective water purification and cleansing compound, removes contaminates such as organisms and bacteria, improves the taste of the water, and removes odors. A micro fabric filter 32, at the bottom, removes any finer sediments as a last filtering step. Acceptable drinking water is obtained from a single container without any heating requirement or use of multiple receptacles. Disposable filter cartridge 24 with the filtering materials used in the present invention will sustain considerable use. When the filtering elements become uneffective, the entire disposable filter cartridge 24 is disgarded and conveniently replaced with a new one. Filtered water recovery compartment and reservoir 54 acts as a holding tank for the purified water, in all embodiments, until withdrawn through spigot 46.

Although I have described embodiments of my invention with considerable details in the foregoing specification, it is to be understood that variations in the structure and design of the invention may be parcticed which do not exceed the intended scope of the appended claims.

What I claim as my invention is:

1. A water purification system comprising:
    (a) a container with a wall having a tubular configuration; a base member covering one end of said container sealing said wall to form a water retaining structure;
    (b) said wall being thickened adjacent said base member to provide a substantially centered support ledge inside the container;
    (c) a removable disposable filter cartridge supported by said support ledge; the end of said container oppositely to said base being opened;
    (d) said opened end of said container having a wall edge thereof fitted with a carrying rim; said carrying rim comprising
    (e) a removable lid thereon; said container arranged for vertical use with said base downwardly and said carrying rim and removable lid upwardly;
    (f) external support members affixed to said base for resting the container structure thereon;
    (g) a crosswise handle diametrically disposed in a raised circular abutment on said removable lid for twist attachment and detachment thereof from said carrying rim by cooperative threading therewith;
    (h) said crosswise handle being apertured on sides by air vents cooperatively aligned with
    (i) an internally positioned air venting straw;
    (j) said container being partitioned in parallel alignment to said base and said removable lid substantially centrally by a removable and disposable filter cartridge;
    (k) said centrally fitted disposable filter cartridge containing filtering materials retained therein by a flow-regulating apertured top cover, side walls of said dispoable cartridge, and a flow-regulating apertured bottom;
    (l) said filtering materials comprising a filter fabric upper covering, a purifying medium core, and a filter fabric lower covering encased in said disposable filter cartridge;
    (m) said disposable filter cartridge dividing said container into an upper unfiltered water receiving compartment and a lower filtered water storage compartment, whereby unfiltered water induced into said upper compartment passes through said disposable filter cartridge for purification and disposition into said lower compartment;
    (n) a manual spigot installed adjacent said base in the container side wall piped into said lower compartment for removal of said purified water therefrom;
    said air venting straw centrally aligned through said filter cartridge housing and extending through said upper unfiltered water receiving compartment to said apertures in said crosswise lid handle;
    whereby said air venting straw arrangement allows air passage through said removable lid via said crosswise lid handle apertures into said filtered water storage compartment for air displacement therein and permits water to gravitate freely through the disposable filter cartridge into said filtered water storage compartment with said spigot opened or closed and allows free-flow of water from the filtered water storage compartment when purified water is retrieved by opening said spigot.

2. The water purification system of claim 1, wherein said filtering materials encased in said disposable filter cartridge comprise a top surface covering of macro fabric filtering material and a bottom surface covering of micro fabric filtering material with a silver impregnated granular activated carbon core as the purifying medium therebetween.

3. The water purification system of claim 1, wherein said air venting straw is removably affixed centrally in alignment with said air vent apertures in said crosswise lid handle and an upper section of a retainer tube in the disposable filter cartridge.

4. The water purification system of claim 1, wherein said disposable filter cartridge is centrally tubed with an air passage structure tapered to fit and removably retain an air venting straw.

5. The water purifiying system of claim 1, further comprising a conical shaped pull-to-open and push-to-close spigot contained in a tubular housing affixed with a vertically aligned finger grip on opposite sides of a pull head positioned adjacent said container base through the lower wall of said container with access into said lower filtered water compartment and reservoir.

* * * * *